United States Patent [11] 3,578,274

[72] Inventors David L. Ginn
 Garden Grove;
 Donald A. Hilmer, Lakewood, Calif.
[21] Appl. No. 772,133
[22] Filed Oct. 31, 1968
[45] Patented May 11, 1971
[73] Assignee McDonnell Douglas Corporation

[54] PALLET ASSEMBLY
 11 Claims, 3 Drawing Figs.
[52] U.S. Cl. .................................................. 244/118,
 244/137, 24/230
[51] Int. Cl. ....................................................... B64c 1/18
[50] Field of Search .......................................... 244/188,
 137; 292/113, 114; 52/588; 105/375; 24/230, 201

[56] References Cited
UNITED STATES PATENTS
2,602,685 7/1952 Martinet et al. ............... 292/114
3,229,436 1/1966 Gerhart et al. ................ 52/588
3,381,921 5/1968 McDonough et al. ........ 244/118

Primary Examiner—Milton Buchler
Assistant Examiner—Steven W. Weinrieb
Attorneys—Walter J. Jason, Donald L. Royer and Ming Y. Moy ABSTRACT: A pallet assembly of the type having movable side portions primarily useful in aircraft and other transportation devices. The pallet assembly includes a latching device whose structural components are secured respectively to the body of the pallet and the side cover thereof in a manner to provide an overcenter locking action when the latching device and side cover are moved from a stowed to a deployed position.

Patented May 11, 1971

INVENTORS
DAVID L. GINN
DONALD A. HILMER
BY
Ming Y. Moy
ATTORNEY 3,578,274

PALLET ASSEMBLY

BACKGROUND OF THE INVENTION

In the general field of air transport, efficient and economical use of equipment dictates a need for both the carriage of freight and conveyance of passengers, and the ability to adapt aircraft for such alternative purposes is of vital importance. To convert an aircraft from freight to passenger carrying and vice versa, rapidly and simply, there are at present pallet conveying and securing systems which comprise rollers and pallet restraints installed longitudinally in the floor of the aircraft. When it is desired to utilize the aircraft as a cargo carrying aircraft, loaded cargo pallets are first moved into the aircraft through its doorway and then moved longitudinally within the aircraft to a desired location. The cargo pallets are then secured in place with pallet restraints. To unload the aircraft the reverse of this operation is followed. When it is desired to utilize the aircraft as a passenger carrying aircraft, passenger seat pallets are moved into the airplane and secured to the seat tracks in the floor of the airplane after the cargo and the cargo pallets are removed from the aircraft.

To facilitate movement of the pallets in and out of aircraft, the pallet widths are generally less than the most narrow portion of the aircraft floor; therefore, when the pallets are positioned in the aircraft, there is usually a cavity between the pallet and the sidewall of the airplane. In addition to presenting a difficult and dangerous footing for passengers, this cavity, or gap, tends to collect undesirable objects such as food particles or other wastes. Further, curious young passengers may be injured by having their fingers caught between the pallet and the floor in satisfying their curiosity. It is a direct improvement on the state-of-the-art to provide a pallet having foldably secured thereto, on either of its side edges, a side cover which can be deployed to cover the cavity between the pallet and the sidewall of the aircraft, and which can be folded onto the pallet whereby to eliminate hazards when the pallets are moved in or out of the aircraft.

A latch which is required to foldably secure the side cover to the pallet must be of sufficient strength to withstand high loads, be positive in retention, and capable of securing the side cover to the pallet in a stowed position or in a deployed position. The latch of this invention accomplishes the above objectives with great assurance.

SUMMARY OF THE INVENTION

In carrying out the principles of this invention, according to one embodiment thereof, there is provided a latching means for latching a first structural member to a second structural member. The latching means includes a hook-shaped end member, a support member, a central coupling section and two outer sections. The hook-shaped end member is fixedly secured to the first structural member while the support member is similarly secured to the second structural member. The support member includes a hook-shaped engaging member adapted to engage the hook-shaped end member. One outer section is fixedly secured to the first structural member, and the other outer section is similarly secured to the support member. The central coupling sections is pivotally connected at its end portions to the outer sections. The central coupling section is pivotal from a deployed position to a stowed position and establishes an overcenter locking action in either position. This overcenter locking action is primarily due to gravity when the first structural member is in the stowed position and primarily due to a stressed condition of the hook-shaped engaging member when the first structural member is in the deployed position. The latching means is employed to foldably secure a side cover to a pallet body so as to allow the side cover to be placed in a deployed position or in a stowed position, as the occasion demands.

BRIEF DESCRIPTION OF THE DRAWINGS

FIG. 1 is a partially schematic, isometric view illustrating a side cover secured to a pallet body employed a fuselage of an airplane;

FIG. 2 is an enlarged side elevational view, partially in section, of the latching means for securing the side to the pallet body; and FIG. 3 is a fragmentary perspective view of the latching means of the present invention.

DESCRIPTION OF A SHOWN EMBODIMENT

Figures 1, 2, 3:
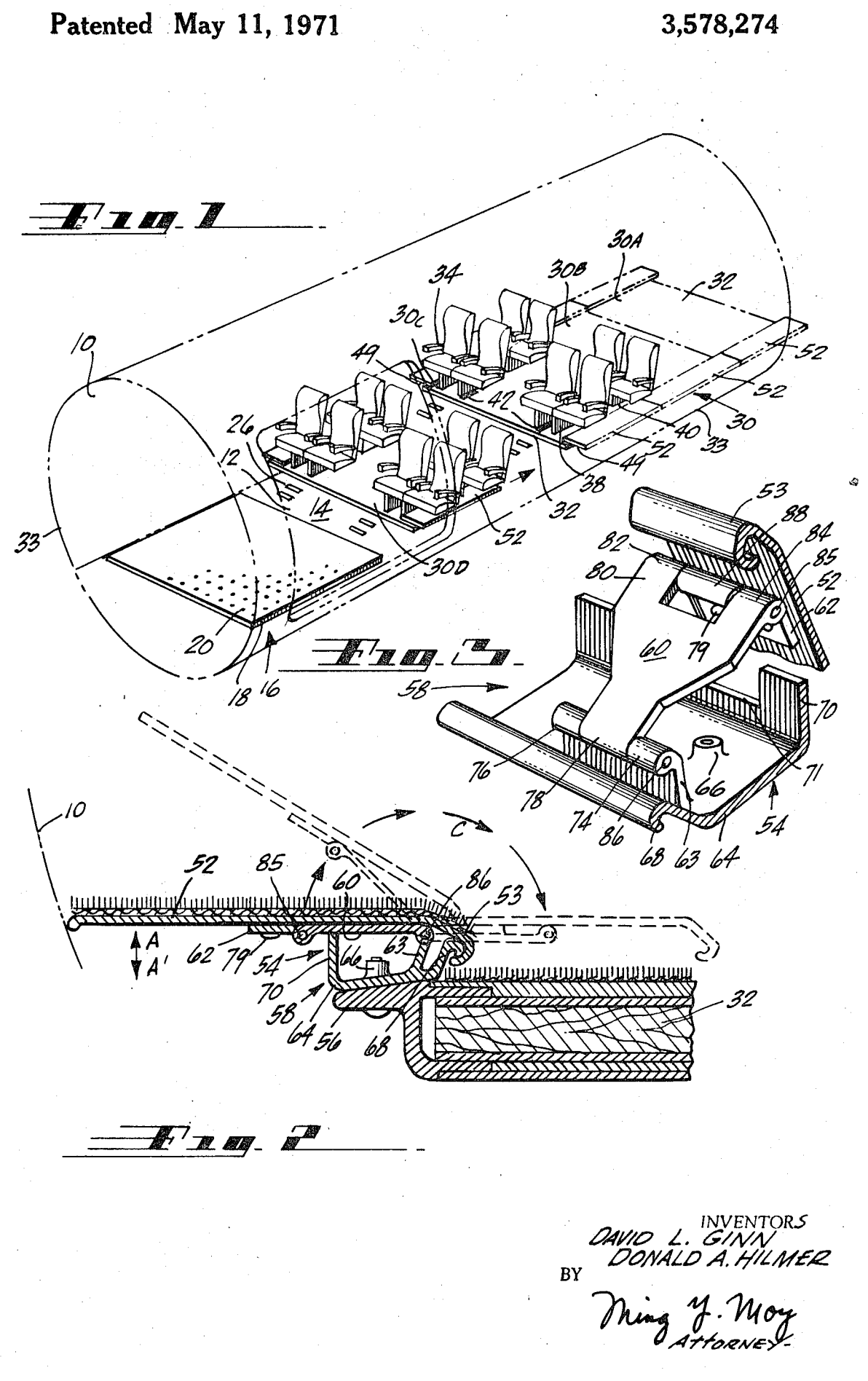

With reference to FIG. 1, an airplane fuselage 10 is provided with a side doorway 12 and a floor 14. The area of the floor adjacent the doorway 12 is provided with a floor mat 16 which comprises a base platform 18 in which are mounted a plurality of pallet supporting floor elements 20. These floor elements 20 are distributed over substantially the entire area of the base platform 18 and are mounted in such a manner that they are free to rotate about any axis, such that a pallet supported by these floor elements can be moved horizontally in any direction. This ball mat 16 is, or may be one of those that is presently used in the cargo conveying art. Mounted to the floor 14 of the aircraft and extending longitudinally thereof are a plurality of roller elements 26, with the rollers 26 defining collectively a conveying plane for passenger seat pallet assemblies 30.

Each seat pallet 30 comprises a base platform or body 32 on which are mounted a plurality of seat units 34. Each seat unit 34 comprises a unitary frame having two forward and two rearward legs 38 and 40, respectively. Mounted in the base platform or body 32 are a plurality of passenger seat pallet latches 42 by which the seat units 34 are secured to the seat tracks of the aircraft floor 14. Each pallet body 32 has further foldably secured thereto on either of its side edges a side cover 52.

To illustrate the manner in which passenger seat pallets 30 are brought into and secured in the aircraft, there are shown, in FIG. 1, four passenger seat pallets 30A, 30B, 30C and 30D. The pallets 30A, 30B and 30C have been located in the aircraft in their desired locations intermediate sidewalls 33, and the latches 42 have each been depressed to their engaged position to properly secure the pallets 30A, 30B and 30C to the aircraft. The side covers 52 of the seat pallets 30A, 30B and 30C have been placed in a deployed position to cover cavities 49 which are spaced between each pallet body 32 and each sidewall 33. A fourth passenger seat pallet 30D has been placed within the aircraft and is in a position to be moved rearwardly therein to a location approximate the third seat pallet 30C, where it likewise will be secured to the aircraft by depressing its latches 42. The side cover 52 of the seat pallet 30D has been placed in a folded or stowed position to facilitate movement of the pallet 30 in the aircraft.

When it is desired to move the passenger seat pallets 30 from the aircraft, the reverse operation is followed, that is to say, the side covers 52 are placed in the folded positions, the seat pallet latches 42 are raised to their disengaged positions, and each seat pallet 30 is moved longitudinally to a location abreast of the doorway 12, and then moved over the ball mat 16 laterally through the doorway 12.

Referring to FIGS. 2 and 3, there is shown a first structural member or pallet body 32 having foldably connected thereto a second structural member or side cover 52 by latching means 54. The pallet body 32 is preferably made of a relatively durable nonmetallic material so that the cost may be held at a minimum. Such a material can be compressed wood or paper fiber which has been chemically treated to increase its durability. To provide the necessary structural integrity and to facilitate connection with the side cover 52, the pallet body 32 has secured thereto and extending laterally from its side edges a metallic lip portion 56. The side cover 52 and the latching means 54 are preferably made of a metallic material such as aluminum, which offers lightweight advantages and which provides the necessary structural integrity.

The latching means includes a hook-shaped end member 53, a support member 58, and central coupling section 60 and outer sections 62 and 63. The hook-shaped end member 53 is fixedly secured to, or an integral part of, the side cover 52.

The support member 58 has a base portion 64 which is secured to the lip portion 56 by fastening means 66. The base 64 includes two upstanding end extrusion members 68 and 70. The extrusion member 68 is a hook-shaped engaging member adapted to engage the hook-shaped end member 53. The extrusion member 70 is an upstanding member extending from the base 64 to provide the structural support for the cover assembly 52. The extrusion member further includes slot 71 which provides the clearance for the central coupling section 60 when it is in the deployed position. The outer section 63 is fixedly secured to, or an integral part of, the base 64 extending intermediate the extrusion members 68 and 70. The outer section 63 has a bifurcated end portion which includes furcations 74 and 76. The central coupling section 60 includes a relatively narrow end portion 78 and a bifurcated end portion 80 which includes furcations 82 and 84. The end portion 78 is pivotally mounted intermediate the furcations 74 and 76 by a pivot pin 86. The outer section 62 includes a relatively narrow end portion 88 which is pivotally mounted intermediate the furcations 82 and 84 by a pin 85. The outer section 62 is further fixedly secured to the side cover 52 by fastening means 79. The central coupling section 60 is pivotal from a deployed position to a stowed position as shown by the full line and the dotted lines, respectively, in FIG. 2, with the two positions being approximately 180° apart. The central coupling section 60 and the outer sections 62 and 63 establish an overcenter locking action when either in the stowed position or in the deployed position.

To facilitate the movement of the seat pallet 30 in and out of the aircraft, the side cover 52 is placed in the folded or stowed position, as shown by the dotted lines in FIG. 2. To change from the deployed position, as shown by the full lines in FIG. 2, to the stowed position, the side cover 52 is rotated approximately 45° clockwise to disengage the hook-shaped end member 53 from the hook-shaped engaging member 68. The rotation of the side cover 52 is accompanied by the pivotal movement of the central coupling section 64 about the hinge pins 85 and 86. After the disengagement of the hook-shaped end portion 53 from the hook-shaped extrusion 68, the side cover 52 and the central coupling section 60 continue their movement, as shown by the direction arrow C, to the folded or stowed position. To change from the stowed position to the deployed position, the reverse operation is followed.

When the side cover 52 is placed in the deployed position, the side cover 52 is prevented from horizontal movement away from the pallet body 32 by latching means 54. More specifically, the side cover 52 is prevented from such movement away from the central coupling section 60 by the pin 85 and the furcations 82 and 84 of the central coupling section 60 which is, in turn, prevented from similar movement away from the pallet body 32 by the pin 86 and the furcations 74 and 76. The side cover 52 is also prevented from vertical movement away from the pallet body 32 in the direction of A¹, as shown by a stressed condition of the direction arrow A–A¹, by the support or extrusion member 70. Similarly, any movement in the A direction by the side cover 52 away from the pallet body 32 is prevented by the hook-shaped extrusion member 68 which latches the hook-shaped end portion 53. When placed in the folded or stowed position, the side cover 52 is similarly prevented from movement by the latching means 54, with the only movement allowed is to move from the stowed position to the deployed position.

While the outer section 63 has been described as a separate part which is fixedly secured to the base 64, it may also be an integral part of the support member 58. Similarly, the hook-shaped end member 53 and the outer section 62, which are fixedly secured to the side cover 52, can be integral parts of the side cover. The integral construction offers the advantage of greater structural support capability and the disadvantage of being more difficult to form. Thus, the type of construction employed should be dependent on the structural support capability required.

We claim:

1. In combination with an aircraft having a fuselage floor and wall a pallet assembly comprising:
    a body adapted to be secured to the fuselage floor;
    a side cover for said body to close space between the body and the fuselage wall; and
    latching means for connecting said side cover to said body and for allowing said side cover to be movable between a stowed position and a laterally deployed position, said latching means establishing an overcenter locking action when said side cover is in the deployed position.

2. The pallet assembly of claim 1 wherein said latching means comprises:
    a hook-shaped end member fixedly secured to said side cover;
    a support member fixedly secured to said body, said support member includes a hook-shaped engaging member adapted to engage said hook-shaped end member;
    a central coupling section having a first and a second end portion;
    a first outer section pivotally connected to said first end portion and fixedly secured to said side cover; and
    a second outer section pivotally connected to said second end portion and fixedly secured to said support member, said central coupling section being pivotal between a deployed position and a stowed position, said stowed position being approximately 180° apart from said deployed position, said central coupling section and said outer sections establishing an overcenter locking action.

3. The pallet assembly of claim 1 wherein said side cover includes an integral hook-shaped end portion, and said latching means comprises a support member fixedly secured to said body, said support member including a base having a first and second end extrusion member and an intermediate extrusion member, said first end extrusion member includes an integral hook-shaped engaging member adapted to engage said hook-shaped end portion, said second end extrusion member extends from said base to engage and support said side cover and said intermediate extrusion member extends from said base intermediate said end extrusion members;
    an outer section fixedly secured to said side cover; and
    a central coupling section having a first and second end portion, said first end portion being pivotally connected to said intermediate extrusion member, and said second end portion being pivotally connected to said outer section.

4. The pallet assembly defined in claim 1 wherein said latching means include:
    central coupling;
    first pivot means connecting said central coupling to said body about a first pivotal axis;
    second pivot means connecting said central coupling to said side cover about a second pivotal axis substantially parallel to said first pivotal axis;
    first engaging means fixedly secured to said body; and
    second means for engaging said first engaging means as said side cover is moved to the deployed position, said second engaging means being fixedly secured to said side cover, whereby said first engaging means and said second engaging means substantially close the space between said body and said side cover when said side cover is in the deployed position.

5. The pallet assembly defined in claim 4 wherein said second engaging means include a member with a hook-shaped end and said first engaging means include a member adapted to mate with said hook-shaped end member when said side cover is in the deployed position to seal the space therebetween, said hook-shaped end member and said mating member extending substantially along the length of said side cover and said body so that the space therebetween is substantially sealed when said side cover is in the deployed position.

6. The pallet assembly defined in claim 4 wherein said central coupling include a plurality of central coupling in substantially the same plane, wherein said first pivot means include first pivot assemblies which connect said central coupling to said body, and wherein said second pivot means include second pivot assemblies which connect said central coupling to said side cover.

7. An aircraft pallet assembly for use in conjunction with an aircraft having a floor and at least one wall, said pallet assembly comprising:
a body portion including means to secure said body portion to said aircraft floor in spaced relationship to said wall;
cover means for substantially covering the space defined between said body portion and said wall;
means for retaining said cover means in connection with said body portion and for allowing lateral deployment of said cover means from a stowed position juxtaposed said body portion to a deployed position substantially covering said space defined between said body portion and said wall.

8. The aircraft pallet assembly defined in claim 7 wherein said retaining means include means for establishing an over-center locking action when said cover means are in the deployed position.

9. The aircraft pallet assembly defined in claim 7 wherein said retaining means include:
central coupling;
first pivot means connecting said central coupling to said body portion about a first pivotal axis;
second pivot means connecting said central coupling to said cover means about a second pivotal axis substantially parallel to said first pivotal axis;
first engaging means fixedly secured to said body portion; and
second means for engaging said first engaging means as said cover means are moved to the deployed position, said second engaging means being fixedly secured to said cover means;
said first engaging means and said second engaging means substantially closing the space between said body portion and said cover means when said cover means are in the deployed position.

10. The aircraft pallet assembly defined in claim 9 wherein said second engaging means abut said first engaging means generally at a line therebetween when said cover means are being moved to the deployed position thereof, the line of abutment between said second engaging means and said first engaging means being substantially parallel to the first and second pivotal axes, said second pivotal axis and said line of abutment defining a plane which passes through the first pivotal axis as said cover means are being deployed.

11. The aircraft pallet assembly defined in claim 9 wherein said cover means include means adapted to abut the aircraft wall to close the space between said cover means and the wall when said cover means are in the deployed position, and wherein said engaging means abut said abutment means when said cover means are being moved to the deployed position, the amount of strain of said abutment means being less when said cover means are in the deployed position than when said cover means are in a predetermined position as said cover means are being deployed.

PO-1050
(5/69)

UNITED STATES PATENT OFFICE
CERTIFICATE OF CORRECTION

Patent No. 3,578,274             Dated      11 May 1971

Inventor(s)    David L. Ginn - Donald A. Hilmer

It is certified that error appears in the above-identified patent and that said Letters Patent are hereby corrected as shown below:

Column 2, line 2, the word --cover-- should be inserted between "side" and "to". Column 3, line 58, the words --a stressed condition of-- should be inserted after "by". Column 4, line 12, "comprises" should be --comprise--; line 48, after "coupling" and before the colon --means-- should be inserted; line 49, --means-- should be inserted after "coupling"; again in line 51, insert --means-- after "coupling"; line 73, insert --means-- after "coupling" in both occurrences, and line 75, insert --means-- after "coupling". Column 5, line 2, insert --means-- after "coupling"; line 23, insert --means-- after "coupling"; line 24, insert --means-- after "coupling"; and line 26, insert --means-- after "coupling". Column 6, delete lines 25 through 28 beginning with "the".

Signed and sealed this 26th day of December 1972.

(SEAL)
Attest:

EDWARD M.FLETCHER,JR.
Attesting Officer

ROBERT GOTTSCHALK
Commissioner of Patents